March 24, 1964     D. A. MANDOLARE     3,126,180
FISH ROD HOLDER AND FOOT TRIP
Filed Dec. 4, 1962     2 Sheets-Sheet 1
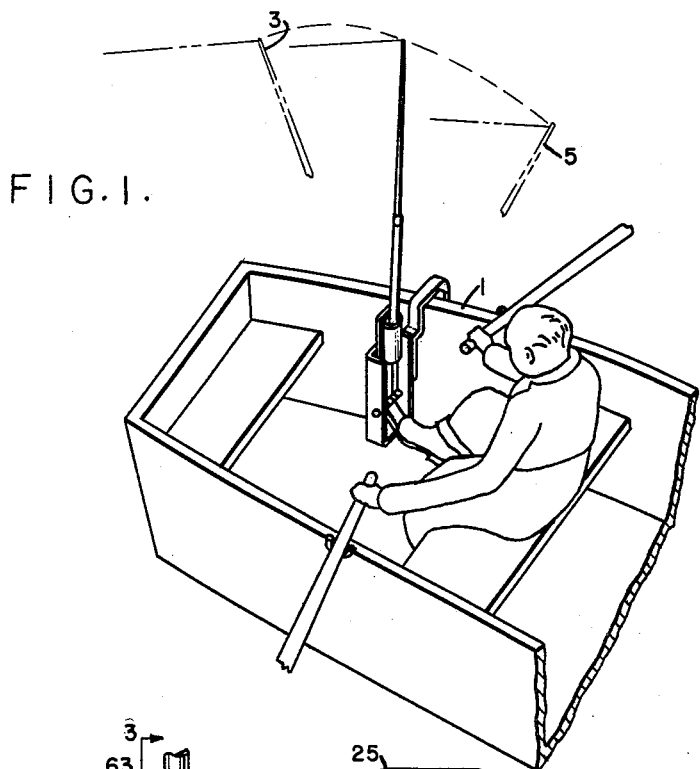
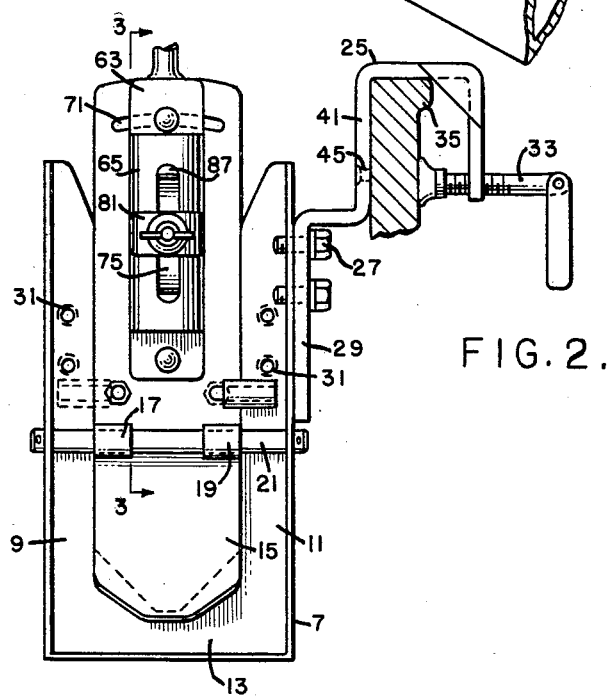
INVENTOR.
DOMINICK A. MANDOLARE
BY
*Walter F. Wessendorf Jr.*
*Attorney*

March 24, 1964  D. A. MANDOLARE  3,126,180
FISH ROD HOLDER AND FOOT TRIP

Filed Dec. 4, 1962  2 Sheets-Sheet 2

INVENTOR.
DOMINICK A. MANDOLARE
BY Walter F. Wessendorf Jr.
attorney

United States Patent Office 3,126,180
Patented Mar. 24, 1964

3,126,180
FISH ROD HOLDER AND FOOT TRIP
Dominick A. Mandolare, 2 Lawnview Ave.,
Fort Edward, N.Y.
Filed Dec. 4, 1962, Ser. No. 242,165
9 Claims. (Cl. 248—41)

This invention relates to a fish rod holder and foot trip mountable in a boat.

The problem in the art to which this invention appertains is the fact that the trolling fisherman has to keep both his hands on the oars to keep the boat moving. Then too, when a fish strikes, the fisherman must drop the oars and attempt to hook the striking fish. After fishing all day, one becomes tired from holding a fishing rod.

An object of the invention is to provide a device for the torlling fisherman which may be easily and quickly, and removably mounted on a boat, removably receives and retains the fish rod and is pedal operated.

Another object of the invention is to provide a device that can be mounted on the boat whether its top rail is flanged outwardly or inwardly.

A still further object of the invention is to provide a device having a fish rod holder that may be adjustably positioned from side to side.

Another object of the invention is to provide a device wherein the fish rod holder adjustably receives and retains rods of different configurations.

A still further object of the invention is to provide a device wherein adjustable pedal stops are provided to limit the forward and backward movement of the foot pedal.

These and other objects of the invention should be appreciated from the detailed specification taken in conjunction with the drawings, in which like reference numerals refer to similar parts throughoutt the several views, in which::

FIG. 1 is a perspective view of the invention mounted on a boat and used by the fisherman;

FIG. 2 is a front elevational view of the invention;

Figure 3:
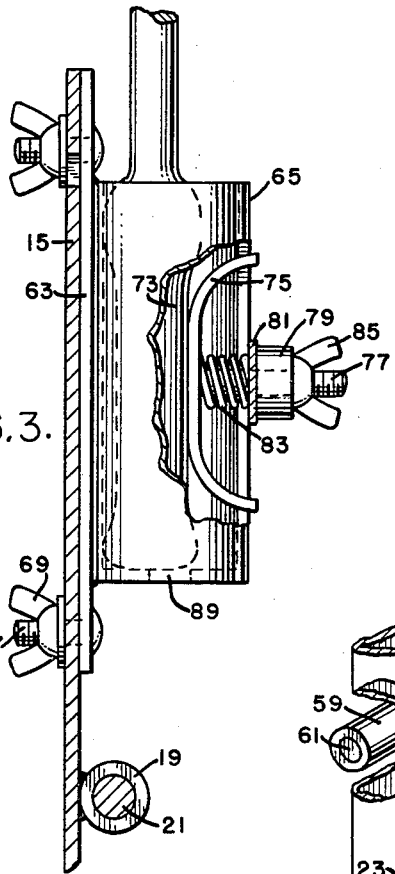
FIG. 3 is a view, partly in section, taken along the line 3—3 of FIG. 2.

As shown in FIG. 1, the invention is mounted on the side 1 of the boat with the fisherman's foot on the pedal. The trolling position of the emplaced fish rod is indicated by reference numeral 3 and the position indicated by reference numeral 5 denotes the position of the fish rod where a striking fish would be hooked.

In FIG. 2 is shown U-shaped bracket 7 having sides 9 and 11 upstanding from web 13. Sides 9 and 11 pivotally mount therebetween foot pedal 15 having two sleeves 17 and 19 suitably secured to each side thereof. Foot pedal 15 has a lower portion whereon the fisherman's foot rests and actuates the pedal. This lower portion is at an angle to the upper portion of the foot pedal 15 as is shown more discernably in FIG. 4.

Sleeves 17 and 19 move freely on shaft 21 and cotter pins 23 at each end of shaft 21 retain shaft 21 in its pivotal mounting in the sides 9 and 11 of bracket 7.

A U-shaped boat clamp 25 is secured to side 9 of the foot pedal bracket 7 by means of cap screws 27 extending through drilled holes in leg 29 of clamp 25 and and with the screws 27 engaged with the tapped holes in side 9.

Additional tapped holes 31 are provided in the foot pedal bracket 7 as shown and may be provided elsewhere in the foot pedal bracket 7 in order that bracket 7 may be mounted at different positions in the boat at the option of the fisherman.

As shown in FIG. 2 bracket 25 is mounted by clamp screw 33 to the side of the boat having its top rail 35 flanged outwardly.

Figure 5:
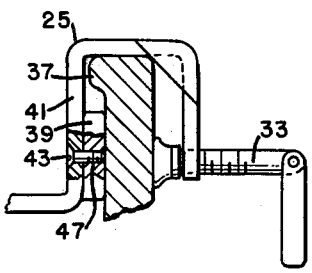
FIG. 5 is a fragmentary view, partly in section, of the boat clamp showing a different type of mounting.

As shown in FIG. 5 bracket 25 is mounted by screw clamp 33 to the side of the boat having its top rail 37 flanged inwardly. Spatial necessity is accommodated in this type of mounting by inserting a spacer block 39 between the side 41 of clamp 25 and the side of the boat, and securing the spacer block 39 by inserting screw 43 through screw hole 45 formed in side 41 and which screw 43 engages tapped hole 47 in block 39 as shown.

Figure 4:
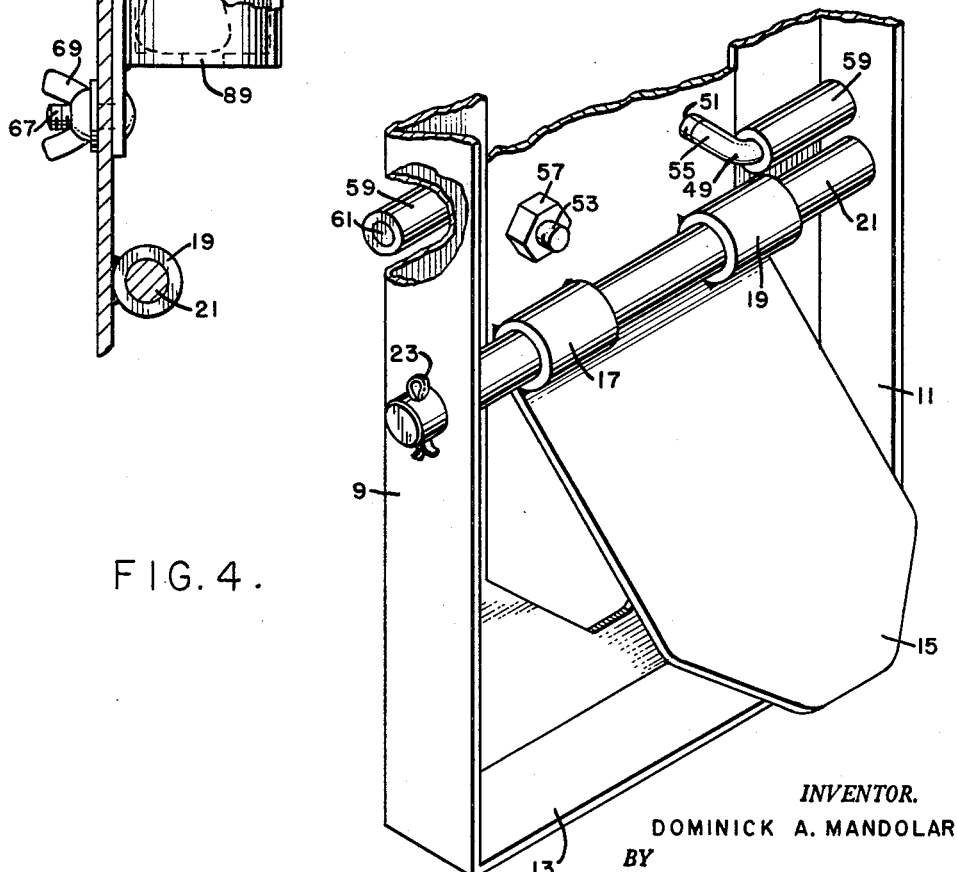
FIG. 4 is a blown up isometric view, partly in section, of the foot pedal and bracket.

As shown more discernably in FIG. 4 L-shaped pedal stops 49 are mounted on foot pedal 15. Tapped holes 51 in foot pedal 15 are engaged by threaded portions 53 of legs 55 with securement provided by nuts 57 engaged on threaded portions 53.

Rubber sleeves 59 are mounted on legs 61 of stops 49 to cushion the abutment of the stops 49 with sides 9 and 11 of foot pedal bracket 7. As arranged and mounted on foot pedal 15, the stops 49 limit the forward an backward movement of foot pedal 15 and this degree of movement is adjustable by turning stops 49 inwardly or outwardly.

Longitudinally configured plate 63 carries the cylindrically configured fish rod holder 65. Plate 63 is mounted on pedal 15 by screws 67 and wing nuts 69. Adjustable mounting of plate 63 relative to foot pedal 15 is achieved by an arcuate slot provided in the uppermost portion of foot pedal 15.

Referring to FIGS. 2 and 3, the fishing rod 73 is removably retained within holder 65 by clamping member 75 the ends of which are formed arcuately upward as shown. Member 75 carries a stud 77 which is received within collar 79 of cross-member 81 suitably secured to holder 65. The compression on spring 83 carried by stud 77 and interposed between member 75 and cross-member 81 may be adjusted by wing nut 85. Longitudinal slot 87 formed in holder 65 limits and restricts sidewise movement of member 75, as viewed in FIG. 2. The diameter of collar 79 is sufficiently greater than the diameter of stud 77 to permit rocking movement of clamping member 75.

With the rocking movement that may be imparted to clamping member 75 upon the insertion of a fish rod of different configurations, and the adjustment that may be made to the spring 83, the holder 65 is able to accommodate fish rods of different configurations.

At the bottom of holder 65 a hole 89 is provided for drainage of any water that would otherwise be contained therein.

Suffice it to say in explanation of the operation of the device that the fisherman mounts same on the boat by means of clamp 25 at the position he desires. With the fish rod emplaced in holder 65 and the degree of movement of foot pedal 15 determined by appropriate adjustment of stops 49, he allows his foot to rest on pedal 15 as shown in the trolling position 3 of FIG. 1. When a fish strikes, he depresses the pedal sufficiently, and his fish rod will be jerked backwardly to hooking position 5 for purposes of hooking the fish.

Having thusly described my invention, I claim:

1. A fish rod holder and foot trip device removably mountable in a boat, said fish rod holder and foot trip device comprising a pedal bracket, a foot pedal, a boat clamp, a plate and a fish rod holder; said pedal bracket having upstanding sides, a transversely disposed shaft mounted by said upstanding sides, said foot pedal being carried by said shaft, said foot pedal carrying L-shaped stops, said stops having rubber sleeves, said stops as arranged and disposed relative to said upstanding sides being adapted to limit the degree of backward and forward movement of said foot pedal upon cushioned abutment of rubber sleeves of said stops with said upstanding sides, said boat clamp being secured to one of said upstanding sides, said boat clamp including a clamp screw, said boat clamp being adapted to be secured to a side of said boat by engagement therewith of said clamp screw, said plate carrying said fish rod holder, said fish rod holder being adapted to removably receive and retain therein a fish rod, an arcuate slot formed in said foot pedal, securing means to secure said plate to said foot pedal, said plate being adapted to be angularly disposed relative to said foot pedal by said arcuate slot and said securing means.

2. The subject matter as claimed in claim 1, wherein said foot pedal has tapped holes, said L-shaped stops have legs, said legs have threaded portions, said tapped holes are engaged by said threaded portions of said stops, and wherein said stops are adapted to be adjustably disposed relative to said foot pedal upon inward or outward engagement of said threaded portions with said tapped holes.

3. The subject matter as claimed in claim 2, wherein nuts engage said threaded portions to secure said stops relative to said foot pedal as disposed.

4. The subject matter as claimed in claim 1, wherein said foot pedal has sleeves and wherein said sleeves are freely mounted on said shaft.

5. The subject matter as claimed in claim 1, wherein said boat clamp is U-shaped.

6. The subject matter as claimed in claim 1, wherein said fish rod holder is cylindrically shaped, said fish rod holder includes a biased clamping member and said biased clamping member engages said fish rod inserted in said fish rod holder.

7. The subject matter as claimed in claim 6, wherein said clamping member has arcuately upturned end portions, said fish rod holder has a longitudinal slot formed therethrough, said upturned end portions extend through said longitudinal slot to limit sidewise movement of said clamping member relative to said fish rod holder.

8. The subject matter as claimed in claim 7, wherein said clamping member carries a stud, said fish rod holder has a cross-member carrying a collar, said stud is received within said collar, a nut is engaged with said stud, a spring is interposed between said clamping member and said cross-member, said spring is carried by said stud, and wherein the compression of said spring is adapted to be adjusted by engagement of said nut with said stud.

9. The subject matter as claimed in claim 1, wherein said securing means comprise holes formed in said plate, a hole formed in said foot pedal, and screws disposed through said holes and engaged by nuts.

References Cited in the file of this patent

UNITED STATES PATENTS

| | | |
|---|---|---|
| 2,238,127 | Nissen | Apr. 15, 1941 |
| 2,756,954 | Whitlow | July 31, 1956 |
| 2,787,431 | Smith | Apr. 2, 1957 |
| 2,961,209 | Wiley | Nov. 22, 1960 |